(12) United States Patent
Whipps et al.

(10) Patent No.: US 10,836,240 B2
(45) Date of Patent: Nov. 17, 2020

(54) VEHICLE DOOR AND DOOR PROVIDING METHOD

(71) Applicant: Ford Global Technologies, LLC, Dearborn, MI (US)

(72) Inventors: Duncan Whipps, Grosse Pointe Farms, MI (US); Tuan Quoc Nguyen, Birmingham, MI (US); Jonathan Szczupak, Troy, MI (US); Gregory Patton, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 16/210,298

(22) Filed: Dec. 5, 2018

(65) Prior Publication Data

US 2020/0180407 A1    Jun. 11, 2020

(51) Int. Cl.
    *B60J 5/04*    (2006.01)
(52) U.S. Cl.
    CPC ........... *B60J 5/0476* (2013.01); *B60J 5/0416* (2013.01); *B60J 5/0437* (2013.01); *B60J 5/0469* (2013.01); *B60J 5/0487* (2013.01)
(58) Field of Classification Search
    CPC . B60J 5/04; B60J 5/0416; B60J 5/0425; B60J 5/0437; B60J 5/0463; B60J 5/0476; B60J 5/0487
    USPC ...................................... 296/146.6, 147, 148
    See application file for complete search history.

(56) References Cited

U.S. PATENT DOCUMENTS

| | | | |
|---|---|---|---|
| 4,850,636 A | 7/1989 | McLaren et al. | |
| 6,036,255 A | 3/2000 | Lester et al. | |
| 6,101,765 A * | 8/2000 | Hashimoto | B60J 5/0416 296/146.5 |
| 6,343,832 B1 * | 2/2002 | Queener | B60J 5/0425 296/146.6 |
| 7,686,379 B2 | 3/2010 | Lemieux | |
| 8,615,932 B2 | 12/2013 | Selina | |
| 9,527,371 B2 | 12/2016 | Flores | |
| 9,623,807 B2 | 4/2017 | Singleton | |
| 2005/0110298 A1 * | 5/2005 | Fin | B60J 5/0487 296/146.5 |
| 2018/0297455 A1 * | 10/2018 | Hale | B60J 5/0476 |
| 2019/0232765 A1 * | 8/2019 | Hoffman | B60J 5/0437 |

* cited by examiner

*Primary Examiner* — Jason S Daniels
(74) *Attorney, Agent, or Firm* — David Coppiellie, Esq.; Carlson, Gaskey & Olds, P.C.

(57) ABSTRACT

A vehicle assembly includes, among other things, a vehicle door changeable back and forth between a first configuration and a second configuration. In the first configuration, the vehicle door is provided by an inner module coupled to an outer module. In the second configuration, the vehicle door is provided by the inner module without the outer module. A door providing method includes providing a vehicle door in a first configuration using an inner module coupled to an outer module. The method further includes providing the vehicle door in a second configuration using the inner module without the outer module.

18 Claims, 5 Drawing Sheets

VEHICLE DOOR AND DOOR PROVIDING METHOD

TECHNICAL FIELD

This disclosure relates generally to a vehicle door and, more particularly, to a vehicle door that can be reconfigured and removed.

BACKGROUND

Some vehicles, particularly off-road vehicles, have detachable doors. In such vehicles, a user can remove an original door from the vehicle. The user can then replace the original door with a replacement door, or choose to operate the vehicle without any door. Both provide the user with a more open-air driving experience than when the original door is used.

SUMMARY

A vehicle assembly according to an exemplary aspect of the present disclosure includes, among other things, a vehicle door changeable back and forth between a first configuration and a second configuration. In the first configuration, the vehicle door is provided by an inner module coupled to an outer module. In the second configuration, the vehicle door is provided by the inner module without the outer module.

In a further non-limiting embodiment of the foregoing assembly, the vehicle door in the first configuration is configured to cover more of a door opening area than the vehicle door in the second configuration.

A further non-limiting embodiment of any of the foregoing assemblies includes an interior handle of the inner module. The interior handle is actuatable to unlatch the vehicle door when the vehicle door is in the first configuration. The interior handle is actuatable to unlatch the vehicle door when the vehicle door is in the second configuration.

In a further non-limiting embodiment of any of the foregoing assemblies, the vehicle door is hingedly connectable to a vehicle body when in the first configuration, and the vehicle door is hingedly connectable to the vehicle body when in the second configuration.

In a further non-limiting embodiment of any of the foregoing assemblies, the vehicle door is latchable to the vehicle body when in the first configuration, and the vehicle door is latchable to the vehicle body when in the second configuration.

A further non-limiting embodiment of any of the foregoing assemblies includes a glass run housed within the outer module.

A further non-limiting embodiment of any of the foregoing assemblies includes an elbow rest provided by the inner module.

A further non-limiting embodiment of any of the foregoing assemblies includes an exterior handle of the outer module.

A further non-limiting embodiment of any of the foregoing assemblies includes an impact absorbing member provided by the inner module.

In a further non-limiting embodiment of any of the foregoing assemblies, the impact absorbing member is enclosed within the inner module.

A door providing method according to another exemplary non-limiting aspect of the present disclosure includes providing a vehicle door in a first configuration using an inner module coupled to an outer module. The method further includes providing the vehicle door in a second configuration using the inner module without the outer module.

In a further non-limiting embodiment of the foregoing method, the vehicle door in the first configuration is configured to cover more of a door opening area than the vehicle door in the second configuration.

A further non-limiting embodiment of any of the foregoing methods includes decoupling the inner module from the outer module, and connecting the inner module to the vehicle body to provide the vehicle door in the second configuration.

A further non-limiting embodiment of any of the foregoing methods includes latching the vehicle door to a vehicle body through a latch in the inner module when the vehicle door is in the first configuration, and latching the vehicle door to the vehicle body through the latch when the vehicle door is in the second configuration.

A further non-limiting embodiment of any of the foregoing methods includes actuating an interior handle of the inner module to unlatch the vehicle door when the vehicle door is in the first configuration, and actuating the interior handle of the inner module to unlatch the vehicle door when the vehicle door is in the second configuration.

In a further non-limiting embodiment of any of the foregoing methods, the vehicle door is hingedly connectable to a vehicle body when in the first configuration, and the vehicle door is hingedly connectable to the vehicle body when in the second configuration.

In a further non-limiting embodiment of any of the foregoing methods, the vehicle door is latchable to the vehicle body when in the first configuration, and the vehicle door is latchable to the vehicle body when in the second configuration.

A further non-limiting embodiment of any of the foregoing methods includes guiding a lowering of a window using a glass run housed within the outer module.

A further non-limiting embodiment of any of the foregoing methods includes selectively connecting and disconnecting the vehicle door from the vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a vehicle door that can be connected to a vehicle when in a first configuration or connected to the vehicle when in a second configuration. The vehicle door can also be entirely removed from the vehicle. These options enable a user to operate the vehicle with a door opening that is closed, partially-open, or fully-open.

Figure 1:
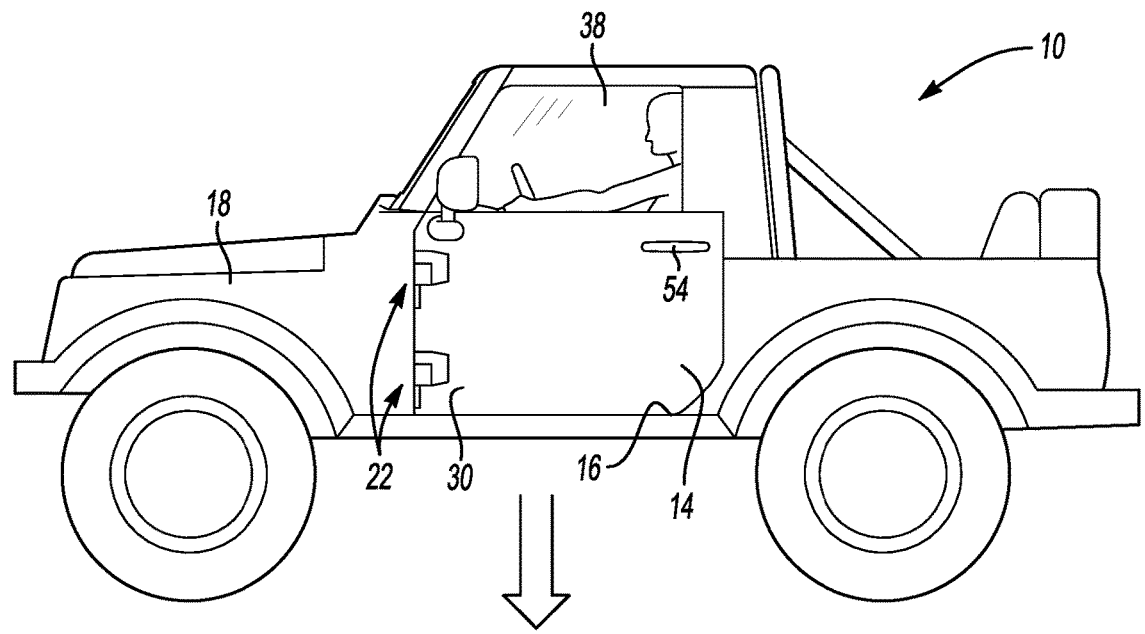
FIG. 1 illustrates a side view of a vehicle having a vehicle door in a first configuration.
Figure 2:
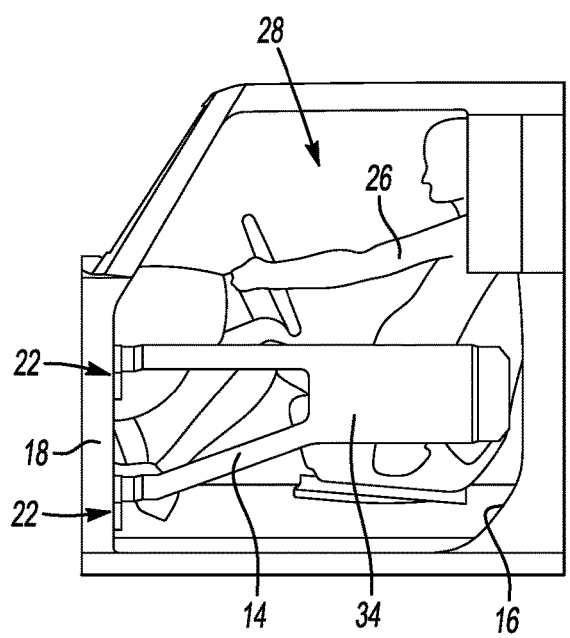
FIG. 2 illustrates a portion of the vehicle of FIG. 1 with the vehicle door in a different, second configuration.
Figure 3:
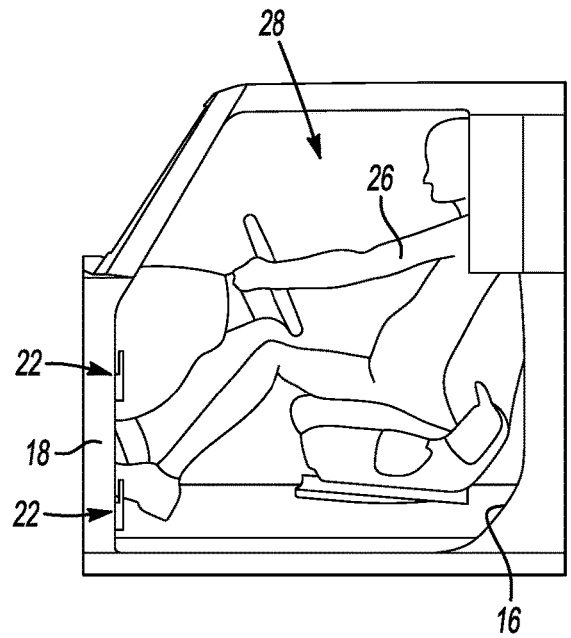
FIG. 3 illustrates the portion of the vehicle shown in FIG. 2 with the vehicle door removed from the vehicle.

Referring to FIGS. 1-3, a vehicle 10 can include a vehicle door 14 disposed within a door opening 16.

In FIG. 1, the vehicle door 14 is in a first configuration and in a closed position. The vehicle door 14 is hingedly connected to a vehicle body 18 through hinges 22. When in the first configuration and closed position, the vehicle door 14 substantially covers the door opening 16 to enclose a user 26 within a passenger compartment 28 of the vehicle 10. As required, the vehicle door 14 in the first configuration can pivot about the hinges 22 back and forth between the closed position and an open position. The user 26 can enter and exit the passenger compartment 28 when the vehicle door 14 in the first configuration is in the open position.

In FIG. 2, the vehicle door 14 has been changed to a second configuration. The vehicle door 14 in the second configuration is hingedly connected to the vehicle body 18 through the hinges 22. When in the second configuration and closed position as shown, the vehicle door 14 partially covers the door opening 16 to provide the user 26 with a partial open-air experience. Thus, when in the closed positions, the vehicle door 14 in the first configuration is configured to cover more of the door opening 16 than when the vehicle door 14 is in the second configuration.

In FIG. 3, the vehicle door 14 has been entirely removed from the vehicle body 18. When removed from the vehicle body 18, the vehicle door 14 does not cover the door opening 16. Removing the vehicle door 14 from the vehicle body 18 fully opens the door opening 16 and provides the user 26 with a full open-air experience.

The vehicle door 14 is a modular door assembly that includes, among other things, an outer module 30 and an inner module 34. In the first configuration of FIG. 1, the outer module 30 and the inner module 34 are coupled together to provide the vehicle door 14. In the second configuration of FIG. 2, the outer module 30 is decoupled from the inner module 34, and the vehicle door 14 is provided by the inner module 34.

Figure 4:
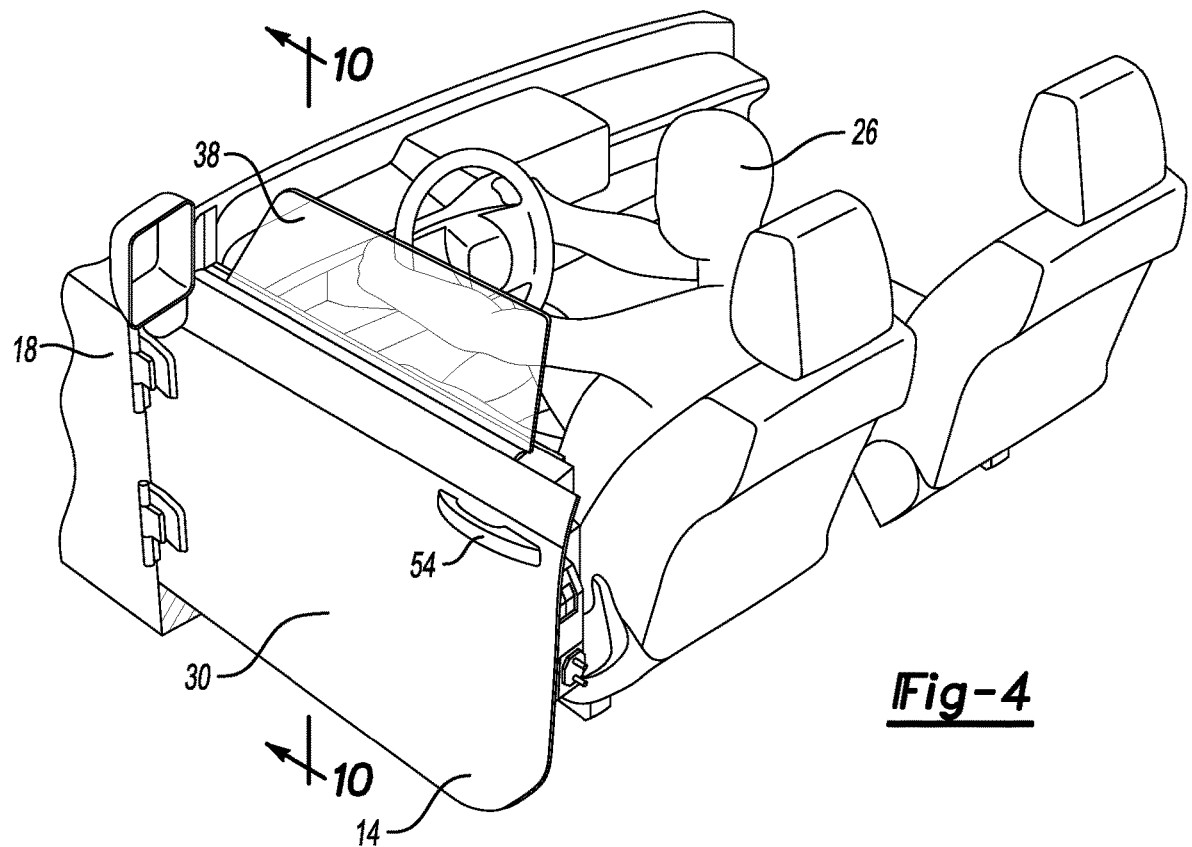
FIGS. 4-9 illustrate a perspective view of selected portions of the vehicle of FIG. 1 as the vehicle door is changed from the first configuration of FIG. 1, to the second configuration of FIG. 2, and to being removed from the vehicle as shown in FIG. 3.
Figure 5:
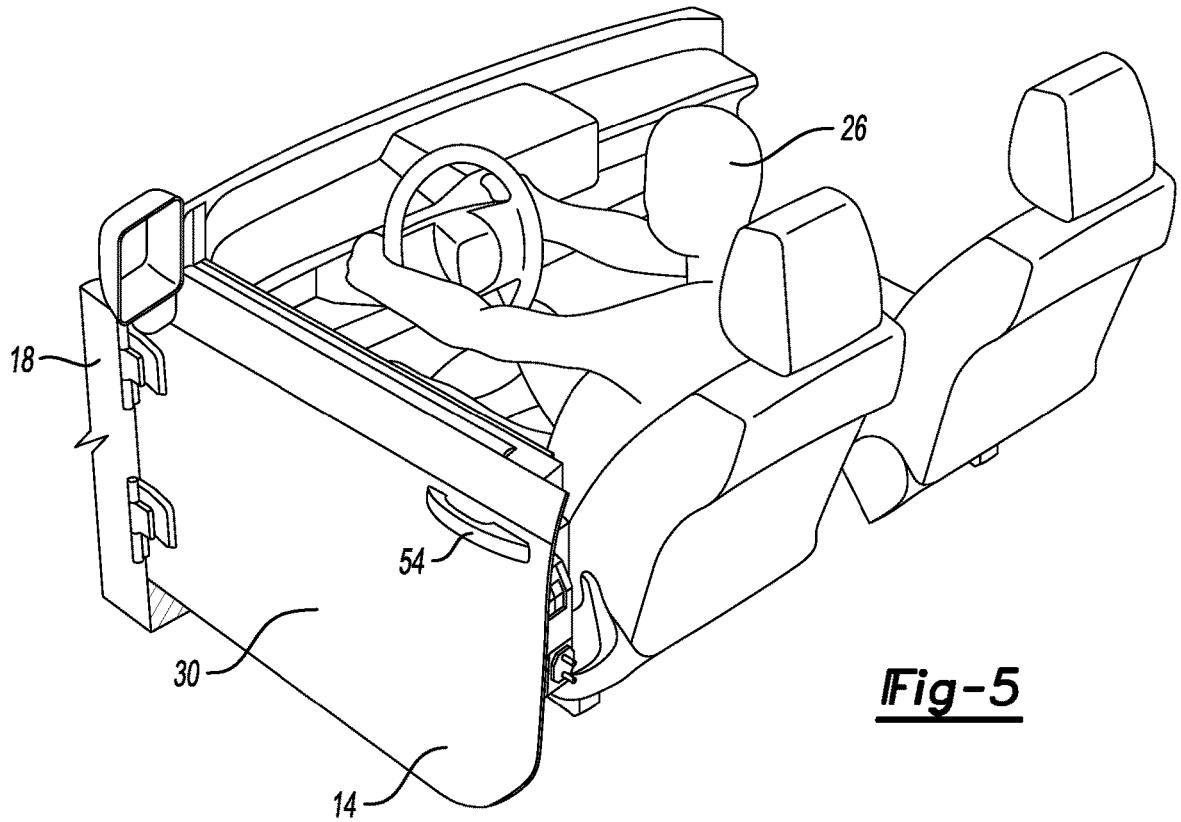

In an exemplary, non-limiting embodiment changing the vehicle door 14 from the first configuration of FIG. 1 to the second configuration of FIG. 2, involves lowering a side window 38 of the vehicle door 14 as shown in FIGS. 4 and 5. The side window 38 is received within the outer module 30 when the side window 38 is lowered to the position of FIG. 5.

Figure 6:
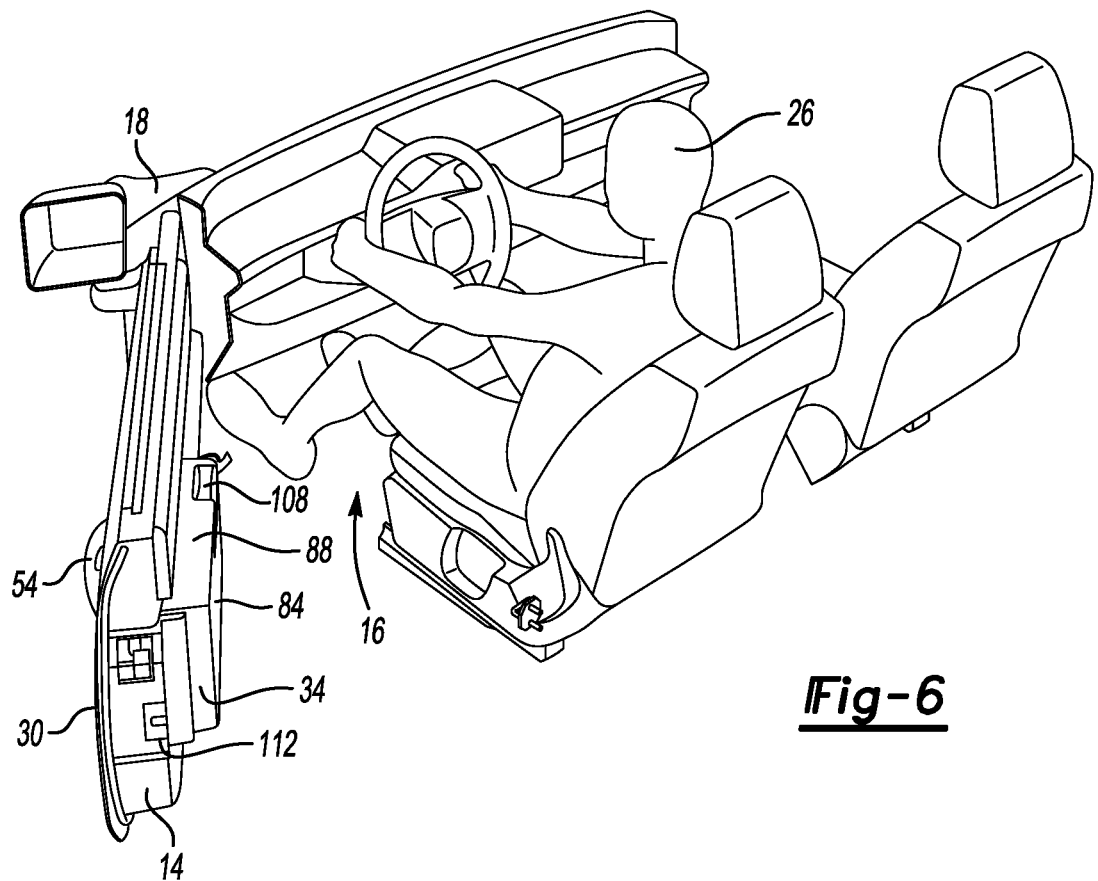
Figure 7:
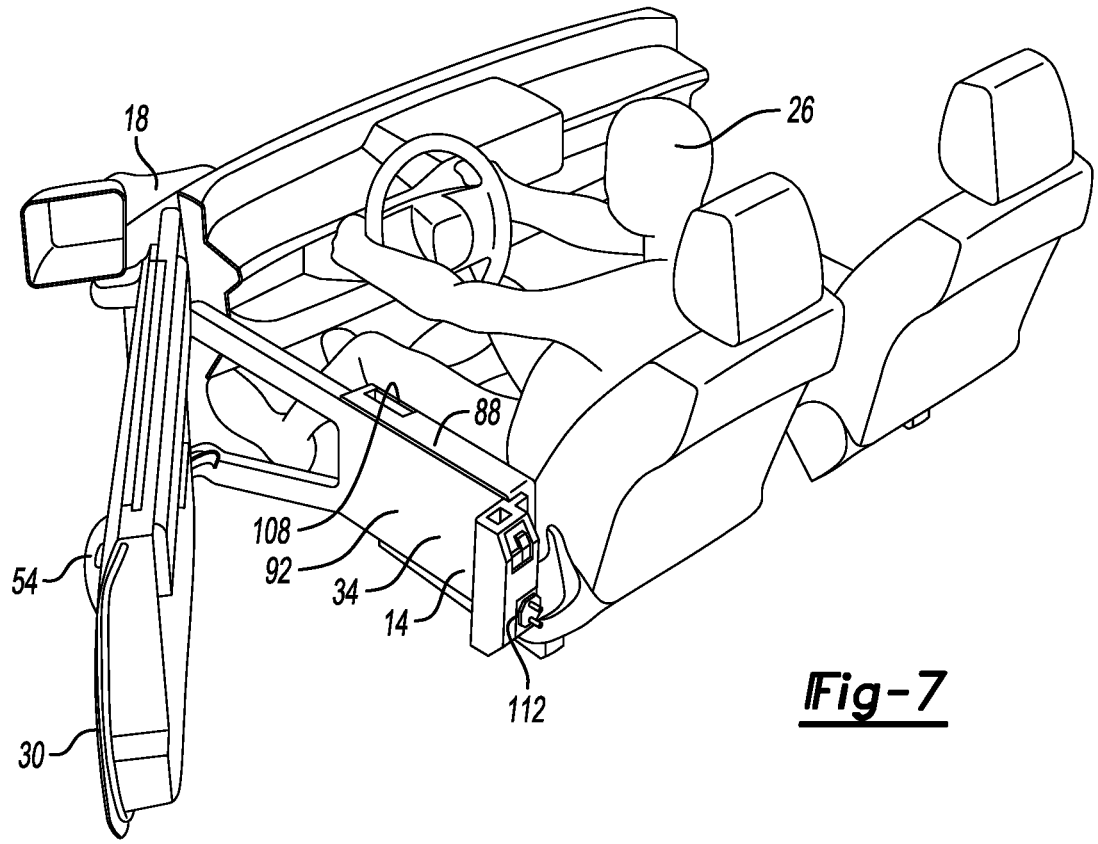

Next, the vehicle door 14 is opened as shown in FIG. 6. The inner module 34 is then decoupled from the outer module 30 as shown in FIG. 7. When the vehicle door 14 is provided by the outer module 30 and the inner module 34 together in the first configuration, the outer module 30 and the inner module 34 are coupled together. Coupling together the outer module 30 and the inner module 34 can occur in a variety of ways including, but not limited to, clips, mechanical fasteners, or both. When the outer module 30 and the inner module 34 are coupled together, the outer module 30 and the inner module 34 move together as the vehicle door 14 is moved between open and closed positions relative to the vehicle body 18.

Figure 8:
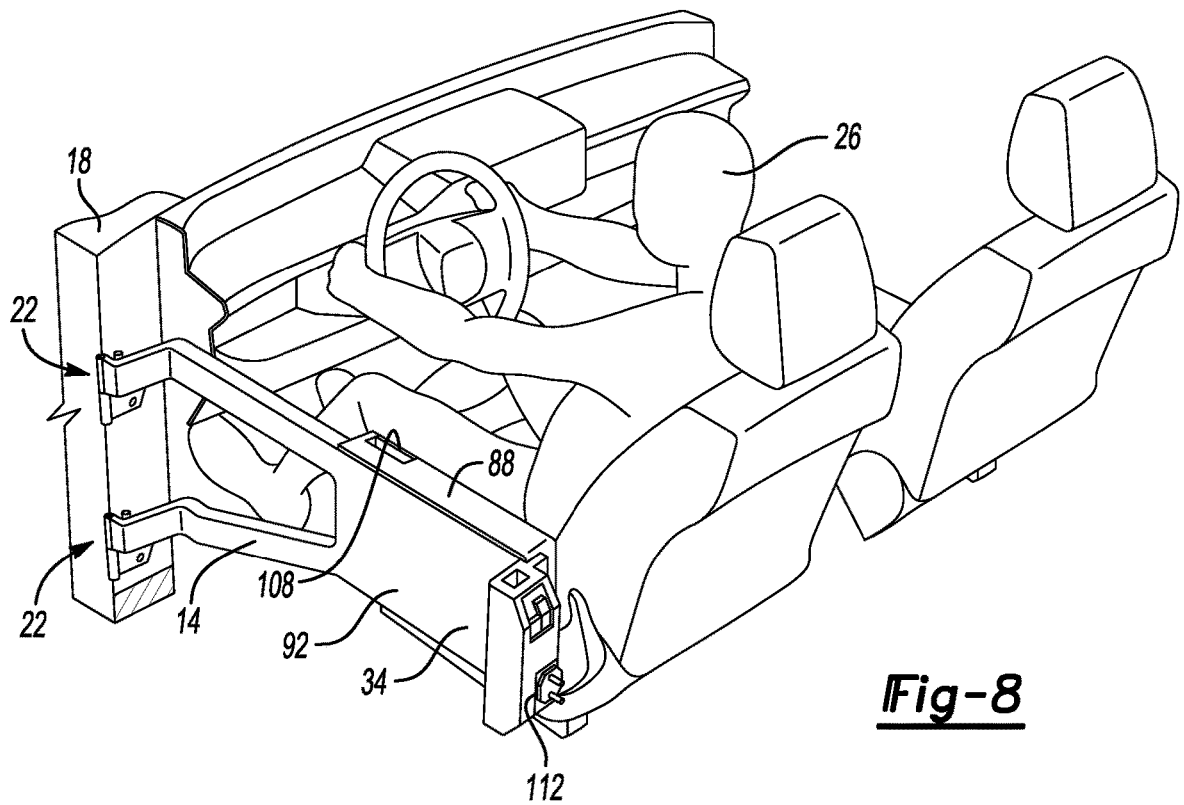
Figure 9:
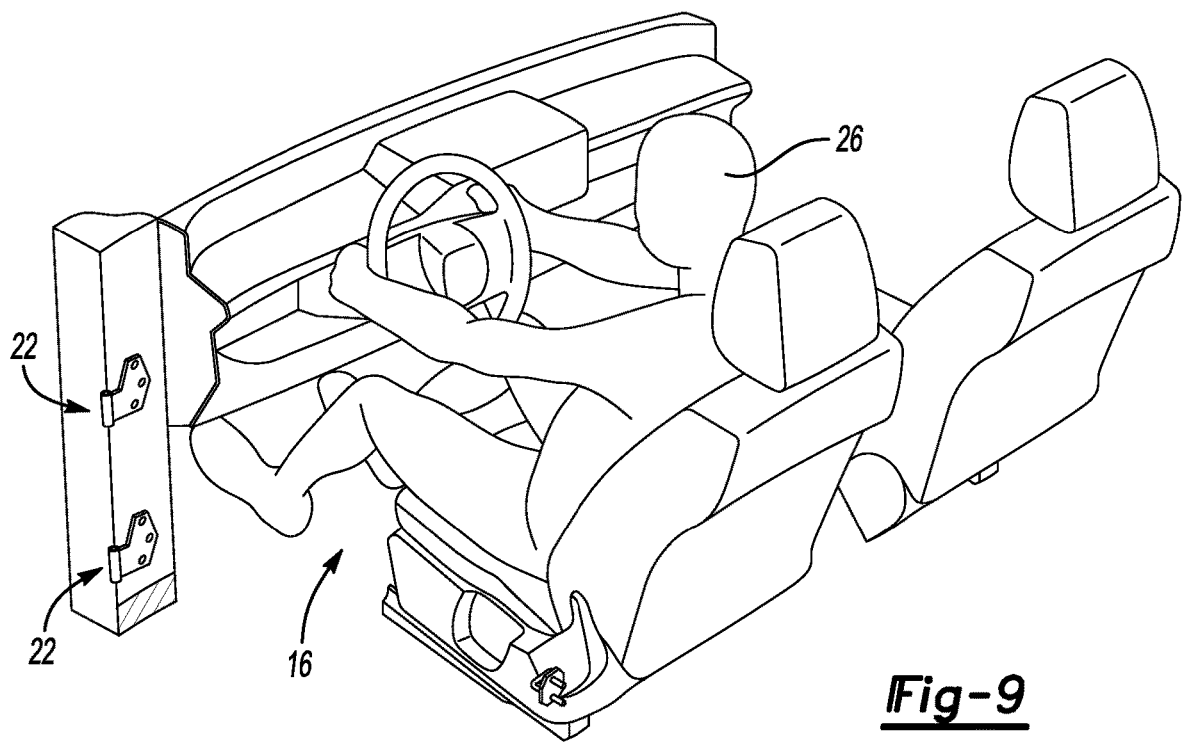

When the outer module 30 is decoupled from the inner module 34, the outer module 30 can be moved away from the vehicle body 18 while the inner module 34 is hingedly connected to the vehicle body, as shown in FIG. 8. The door assembly 14 is then in the second configuration. The inner module 34 can move from the closed position of FIG. 8 to an open position by pivoting about the hinges 22. When the vehicle 10 is driven and the inner module 34 is used as the vehicle door 14 in the second configuration, the user 26 experiences a partially open side door. If more open area is desired, the inner module 34 can be removed from the hinges 22 so that the user 26 can operate the vehicle 10 with the door opening 16 fully open as shown in FIG. 9.

Figure 10:
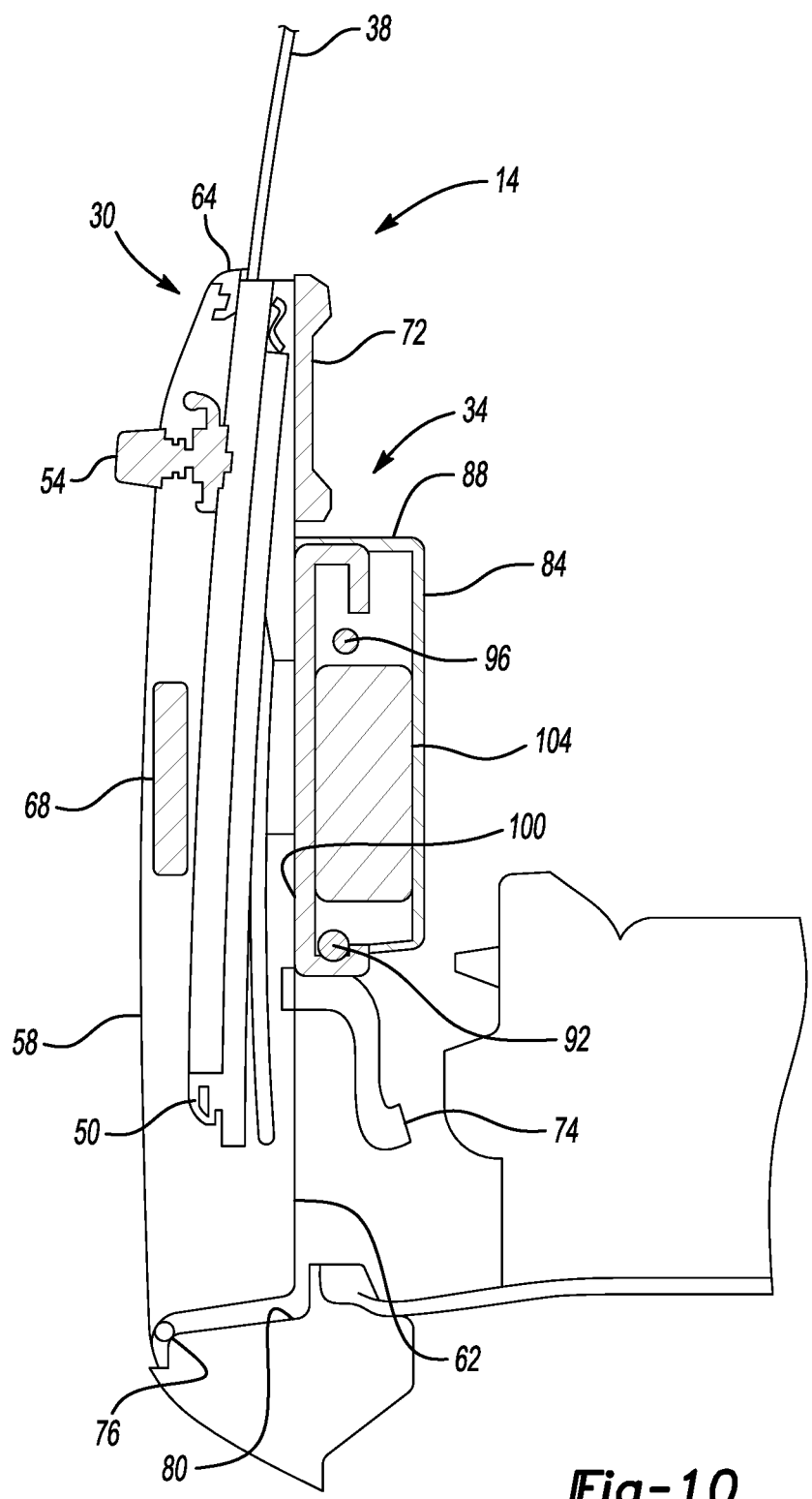
FIG. 10 illustrates a section through the vehicle door when in the first configuration.

FIG. 10 is a section view through the vehicle door 14 in the first configuration. With reference to FIG. 10 and FIGS. 1-3, the side window 38 is held within a glass run 50 provided by the outer module 30. The glass run 50 holds and guides the side window 38 when raising and lowering the side window 38. The outer module 30 can include a regulator motor, glass rails, and channels to assist in raising or lowering the side window 38. When in the vehicle door 14 is in the first configuration, the side window 38 can be raised and lowered as the user 26 desires.

The outer module 30 further incorporates an exterior handle 54. When the user 26 is outside the passenger compartment 28, the user 26 can actuate the exterior handle 54 to unlatch the vehicle door 14 from the vehicle body 18 thereby permitting movement of the vehicle door 14 from the position of FIGS. 4 and 5 to the open position of FIG. 6.

In addition to the glass run 50 and the exterior handle 54, the outer module 30 further includes, in the exemplary embodiment, an outer sheet metal layer 58, an inner sheet metal layer 62, beltline seals 64, an intrusion beam 68, an upper interior trim piece 72, wiring 74, and a primary seal 76. The wiring 74 is used to operably connect the outer module 30 to the other portions of the vehicle 10. The primary seal 76 interfaces with a door sill 80 when the vehicle door 14 is in the first configuration and in the closed position.

To change the vehicle door 14 from the first configuration of FIG. 1 to the second configuration of FIG. 2, the wiring 74 can be decoupled from the vehicle 10, the outer module 30 decoupled from the inner module 34, and the outer module 30 then lifted off the hinges 22.

The inner module 34 includes, in the disclosed non-limiting example, an interior trim piece 84 that provides the user 26 seated within the passenger compartment 28 with an elbow rest 88. The inner module 34 additionally includes an exoskeleton frame 92, release handle wiring 96, other wiring 100, and an impact absorbing member 104. The release handle wiring 96, the other wiring 100, as well as the impact absorbing member 104, can be sandwiched between the exoskeleton frame 92 and the interior trim piece 84 of the inner module 34.

When the vehicle door 14 is in the second configuration where the outer module 30 is decoupled from the inner module 34 and removed from the vehicle body 18, the exoskeleton frame 92 is exposed and visible from outside of the vehicle (as shown in FIG. 2). The inner module 34 can hingedly connect to the vehicle body 18 and latch to the vehicle body 18 independent of the outer module 30.

In an exemplary, non-limiting embodiment the inner module 34 includes an inner handle 108 (see FIGS. 6-8). The inner handle 108 can be actuated by the user 26 to transition a latch 112. The latch 112 in a latched position holds the inner module 34 to the vehicle body 18 in a closed position. Transitioning the latch 112 to an unlatched position permits movement of the inner module 34 away from the vehicle body 18. The latch 112 of the inner module 34 is used to hold the vehicle door 14 in the closed position when the vehicle door 14 is in the first configuration. The latch 112 can also be used to hold the vehicle door 14 in the closed position when the vehicle door 14 is in the second configuration.

The inner handle 108 can be actuated by the user 26 to transition the latch 112. The inner handle 108 can be actuated by the user when exiting the passenger compartment 28 for example. When the user 26 is outside the passenger compartment 28, and outside the vehicle 10, the user 26 can reach through the door opening 16 to actuate the inner handle 108. That is, when the vehicle door 14 is in the second configuration, the inner handle 108 is accessible by the user 26 when the user 26 is outside of the vehicle 10. When the vehicle door 14 is in the second configuration, the outer module 30 does not block the user 26 from accessing the inner handle 108.

The impact absorbing member 104 can be a foam bolster, or some other structure utilized to absorb loads, particularly loads resulting from a side impact. The impact absorbing member 104 is enclosed within the inner module 34 in this example. Since the impact absorbing member 104 is part of the inner module 34, the impact absorbing member 104 is available when the vehicle door 14 is in the first configuration of FIG. 1 and when in the second configuration of FIG. 2.

Features of the disclosed example include a modular door system that can provide a user with a closed passenger compartment, a partially open-air experience within the compartment, or a fully open-air experience within the compartment. The modular door system can selectively provide these user experiences to the user within one integrated/modular package.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
a vehicle door changeable back and forth between a first configuration and a second configuration,
in the first configuration, the vehicle door is provided by an inner module coupled to an outer module,
in the second configuration, the vehicle door is provided by the inner module without the outer module; and
wiring that, in the first configuration, operably connects the outer module to other portions of a vehicle having the vehicle door.

2. The vehicle assembly of claim 1, wherein the vehicle door in the first configuration is configured to cover more of a door opening area than the vehicle door in the second configuration.

3. The vehicle assembly of claim 1, further comprising an interior handle of the inner module, the interior handle actuatable to unlatch the vehicle door when the vehicle door is in the first configuration, the interior handle actuatable to unlatch the vehicle door when the vehicle door is in the second configuration.

4. The vehicle assembly of claim 1, wherein the vehicle door is hingedly connectable to a vehicle body when in the first configuration, and the vehicle door is hingedly connectable to the vehicle body when in the second configuration.

5. The vehicle assembly of claim 1, further comprising a glass run housed within the outer module.

6. The vehicle assembly of claim 1, further comprising an exterior handle of the outer module.

7. The vehicle assembly of claim 1, further comprising an impact absorbing member provided by the inner module.

8. The vehicle assembly of claim 7, wherein the impact absorbing member is enclosed within the inner module.

9. The vehicle assembly of claim 1, further comprising a regulator motor within the outer module.

10. A door providing method, comprising:
providing a vehicle door in a first configuration using an inner module coupled to an outer module, and operably coupling the outer module to a vehicle through wiring when providing the vehicle door in the first configuration; and
providing the vehicle door in a second configuration using the inner module without the outer module.

11. The door providing method of claim 10, further comprising:
decoupling the inner module from the outer module; and
connecting the inner module to the vehicle body to provide the vehicle door in the second configuration.

12. The door providing method of claim 10, further comprising latching the vehicle door to a vehicle body through a latch in the inner module when the vehicle door is in the first configuration, and latching the vehicle door to the vehicle body through the latch when the vehicle door is in the second configuration.

13. The door providing method of claim 12, further comprising actuating an interior handle of the inner module to unlatch the vehicle door when the vehicle door is in the first configuration, and actuating the interior handle of the inner module to unlatch the vehicle door when the vehicle door is in the second configuration.

14. The door providing method of claim 10, wherein the vehicle door is hingedly connectable to a vehicle body when in the first configuration, and the vehicle door is hingedly connectable to the vehicle body when in the second configuration.

15. The door providing method of claim 14, wherein the vehicle door is latchable to the vehicle body when in the first configuration, and the vehicle door is latchable to the vehicle body when in the second configuration.

16. The door providing method of claim 10, further comprising guiding a lowering of a window using a glass run housed within the outer module.

17. The door providing method of claim 10, further comprising selectively connecting and disconnecting the vehicle door from the vehicle.

18. The door providing method of claim 10, further comprising a regulator motor within the outer module.

* * * * *